Figure 1:
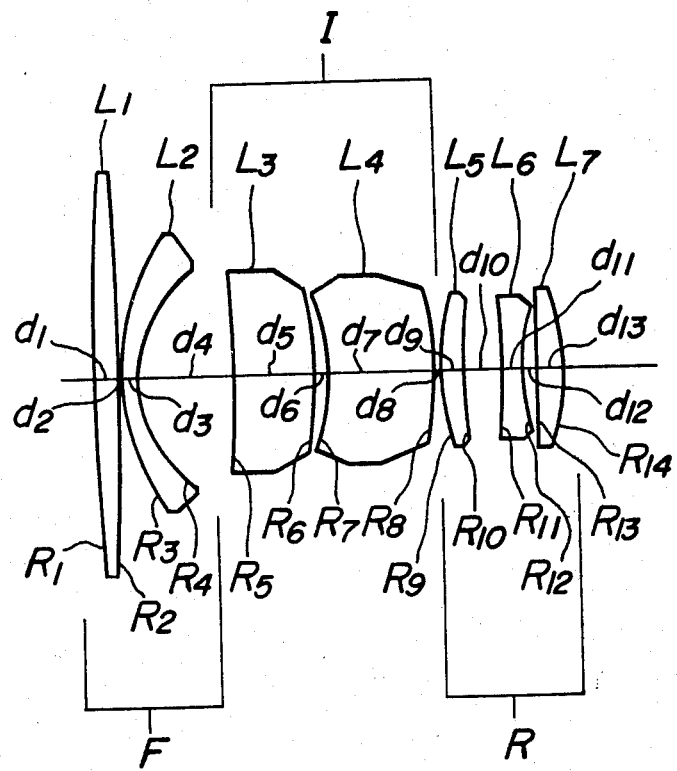

United States Patent
Maeda

[11] 3,926,506
[45] Dec. 16, 1975

[54] RETROFOCUS TYPE WIDE ANGLE LENS SYSTEM

[75] Inventor: Haruo Maeda, Fuchu, Japan

[73] Assignee: Olympus Optical Company Limited, Tokyo, Japan

[22] Filed: Jan. 27, 1975

[21] Appl. No.: 544,662

[30] Foreign Application Priority Data
Jan. 31, 1974   Japan.............................. 49-13327

[52] U.S. Cl. ................................................. 350/214
[51] Int. Cl.² .............................................. G02B 11/34
[58] Field of Search .................................... 350/214

[56] References Cited
UNITED STATES PATENTS
3,737,213   6/1973   Yamashita ......................... 360/214

*Primary Examiner*—John K. Corbin
*Attorney, Agent, or Firm*—Waters, Schwartz & Nissen

[57] ABSTRACT

This invention relates to a retrofocus type wide angle lens system. The lens system consists of three groups and seven lenses. The front lens group consists of a biconvex lens followed by a negative meniscus lens turning its convex surfaces toward the object side of the system. The intermediate lens group consists of a positive meniscus lens turning its concave surfaces toward the object side and followed by a negative meniscus lens turning its concave surfaces toward the object side. The rear lens group consists of a positive meniscus lens turning its convex surfaces toward the object side, a biconcave lens and a positive lens.

1 Claim, 4 Drawing Figures

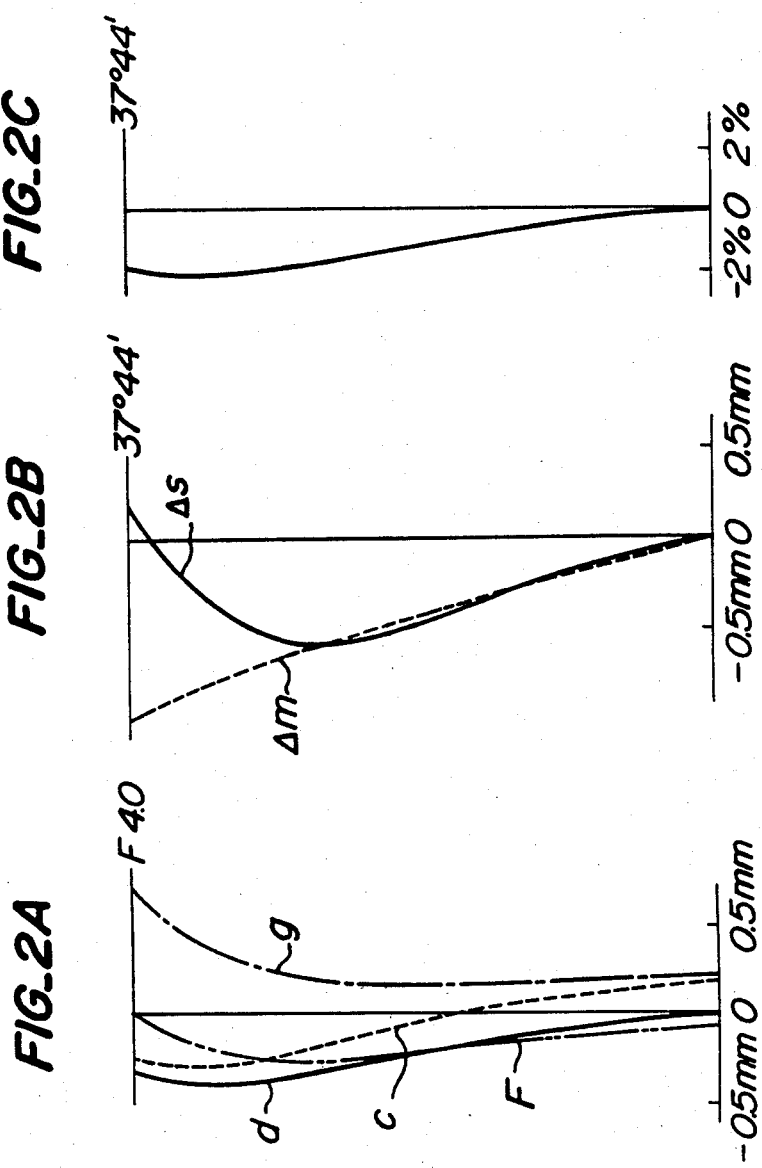

RETROFOCUS TYPE WIDE ANGLE LENS SYSTEM

This invention relates to a retrofocus type wide angle lens.

In the case of designing a wide angle lens system whose back-focal length in longer than an overall focal length thereof, it has been the common practice to provide a retrofocus type lens system whose front lens group consists of negatively refractive lenses and rear lens group consists of positively refractive lenses. In such kind of retrofocus type lens system, in order to make its back focus long, it is necessary to increase negative refractive power of the front lens group or to make long the air space between the front and rear lens groups.

If the negative refractive power of the front lens group is increased, it is possible to effectively make the lens system small, but coma, spherical aberration and negative distortion become increased.

If the air space between the front and rear lens groups is made long, it is possible to suppress various aberrations, but the lens system becomes large in size.

An object of the invention is to provide a retrofocus type wide angle lens designed to operate with a large angle of view, upwards of 75°28', at aperture ratios as high as F 4.0, a back focus (B. F.) which is 1.38 times longer than an overall focal length and with significant suppression of various aberrations as well as maintenance of sufficiant illumination at the corners of the projected image.

Another object of the invention is to provide a retrofocus type wide angle lense whose total length is 1.31 times longer than an overall focal length thereof contrary to the prior art retrofocus type wide angle lens satisfying the above mentioned requirement and having a total length on the order of 1.5 to 1.7 times longer than an overall focal length thereof, and hence which is very small in size.

The invention will now be described in greater detail with reference to the accompanying drawings, wherein:

FIG. 1 is a diagrammatic view of a retrofocus type wide angle lens according to the invention; and FIG. 2A, 2B and 2C are graphical representations of the spherical aberrations, astigmatisms and distortion, respectively.

With reference to FIG. 1 of the drawing, the retrofocus type wide angle lens comprises a front lens group F, consisting of a biconvex lens $L_1$ and a negative meniscus lens $L_2$ turning its convex surfaces toward the object side of the system, an intermediate lens group I, consisting of a positive meniscus lens $L_3$ turning its concave surfaces toward the object side and a negative meniscus lens $L_4$ turning its concave surfaces toward the object side, and a rear lens group R, consisting of a positive meniscus lens $L_5$ turning its convex surfaces toward the object side, a biconcave lens $L_6$ and a positive lens $L_7$. As seen from the above, the lens system according to the invention comprises three groups F, I and R and seven lenses $L_1$ to $L_7$ and the negative front lens group F is separated from the positive lens group R by the intermediate lens group I having a positive refractive power.

In addition, the rear surface $R_6$ of the positive meniscus lens $L_3$ and the front surface $R_7$ of the negative meniscus lens $L_4$ bounding an air space $d_6$ defines an air lens bearing a negative refractive power. Such means ensures a long back focus while maintaining a good balance between various aberrations without increasing the negative refractive power of the front lens group F and without making the overall length of the lens system long.

In accordance with the invention, the air space $d_4$ to $d_8$ bounded by the rear surface $R_4$ of the negative meniscus lens $L_2$ of the front lens group F and by the front surface $R_9$ of the positive meniscus lens $L_5$ of the rear lens group R is suitably selected, and the front surface $R_5$ of the positive meniscus lens $L_3$ of the intermediate group I is made negative and the radius of curvature thereof is made relatively large. These measures make it possible to make the overall length of the lens system small, and the diameter of the front lens $L_1$ small with various aberrations balanced.

The coma can be corrected by the front and intermediate lens groups F and I, respectively, but the coma still remaining can significantly be corrected with substantial suppression of astigmatism by suitably selecting the air spaces $d_{10}$ and $d_{12}$ bounded by the positive meniscus lens $L_5$ and the biconcave lens $L_6$ on the one hand bounded by the biconvex lens $L_6$ and the positive lens $L_7$ on the other hand.

Radii of curvatures $R_1$ to $R_{14}$ and thicknesses and separations $d_1$ to $d_{13}$, based upon a numerial value of 100 for the overall focal length, along with the refractive indices $n_1$ to $n_7$ and the Abbe numbers $v_1$ to $v_7$ of the system shown in FIG. 1 are substantially as given in the following table.

$f = 100$, F 4.0, $f_B = 138.49$ Angle of view 75°28'

| Lens | Radii | Thicknesses and Separations | | n | | v |
|---|---|---|---|---|---|---|
| $L_1$ | $R_1$ 865.02 | $d_1$ | 6.83 | $n_1$ | 1.67003 | $v_1$ 47.3 |
| | $R_2$ −1424.08 | $d_2$ | 1.05 | | | |
| $L_2$ | $R_3$ 72.62 | $d_3$ | 3.82 | $n_2$ | 1.61800 | $v_2$ 63.4 |
| | $R_4$ 35.36 | $d_4$ | 27.33 | | | |
| $L_3$ | $R_5$ −463.53 | $d_5$ | 22.75 | $n_3$ | 1.66892 | $v_3$ 45.0 |
| | $R_6$ −114.16 | $d_6$ | 2.67 | | | |
| $L_4$ | $R_7$ −68.35 | $d_7$ | 31.42 | $n_4$ | 1.67790 | $v_4$ 55.3 |
| | $R_8$ −77.90 | $d_8$ | 0.88 | | | |
| $L_5$ | $R_9$ 67.11 | $d_9$ | 6.78 | $n_5$ | 1.72600 | $v_5$ 53.6 |
| | $R_{10}$ 238.28 | $d_{10}$ | 10.35 | | | |
| $L_6$ | $R_{11}$ −370.33 | $d_{11}$ | 6.97 | $n_6$ | 1.75520 | $v_6$ 27.5 |
| | $R_{12}$ 70.66 | $d_{12}$ | 2.75 | | | |
| $L_7$ | $R_{13}$ ∞ | $d_{13}$ | 7.90 | $n_7$ | 1.72600 | $v_7$ 53.6 |
| | $R_{14}$ −64.98 | | | | | |

In FIGS. 2A, 2B and 2C are shown the spherical aberrations, astigmatisms and distortion of the retrofocus type wide angle lens system according to the invention.

As stated hereinafter, the retrofocus type wide angle lens system according to the invention has an aperture ratio as high as F 4.0, a large angle of view of 75°28' a back focus of which is 1.38 times longer than the overall focal length, with segnificant suppression of various aberrations as well as maintainance of sufficient illumination at the corners of the projected image, the total length of the lens system being very small in size which is 1.31 times the overall focal length.

What is claimed is:

1. A retrofocus type wide angle lens system with a front lens group and a rear lens group separated by an intermediate lens group, said front lens group consisting of a biconvex lens followed by a negative meniscus lens turning its convex surfaces toward the object side of the system, said intermediate lens group consisting of a positive meniscus lens turning its concave surfaces toward the object side and followed by a negative meniscus lens turning its concave surfaces toward the object side, and said rear lens group consisting of a positive meniscus lens turning its convex surfaces toward the object side, a biconcave lens and a positive lens, said system conforming substantially to the following conditions:

$f = 100$, F 4.0

| Lens | Radii | | Thicknesses and Separations | | n | | $v$ |
|---|---|---|---|---|---|---|---|
| | $R_1$ | 865.02 | | | | | |
| $L_1$ | | | $d_1$ | 6.83 | $n_1$ | 1.67003 | $v_1$ 47.3 |
| | $R_2$ | −1424.08 | $d_2$ | 1.05 | | | |
| | $R_3$ | 72.62 | | | | | |
| $L_2$ | | | $d_3$ | 3.82 | $n_2$ | 1.61800 | $v_2$ 63.4 |
| | $R_4$ | 35.36 | $d_4$ | 27.33 | | | |
| | $R_5$ | −463.53 | | | | | |
| $L_3$ | | | $d_5$ | 22.75 | $n_3$ | 1.66892 | $v_3$ 45.0 |
| | $R_6$ | −114.16 | $d_6$ | 2.67 | | | |
| | $R_7$ | −68.35 | | | | | |
| $L_4$ | | | $d_7$ | 31.42 | $n_4$ | 1.67790 | $v_4$ 55.3 |
| | $R_8$ | −77.90 | $d_8$ | 0.88 | | | |
| | $R_9$ | 67.11 | | | | | |
| $L_5$ | | | $d_9$ | 6.78 | $n_5$ | 1.72600 | $v_5$ 53.6 |
| | $R_{10}$ | 238.28 | $d_{10}$ | 10.35 | | | |
| | $R_{11}$ | −370.33 | | | | | |
| $L_6$ | | | $d_{11}$ | 6.97 | $n_6$ | 1.75520 | $v_6$ 27.5 |
| | $R_{12}$ | 70.66 | $d_{12}$ | 2.75 | | | |
| | $R_{13}$ | ∞ | | | | | |
| $L_7$ | | | $d_{13}$ | 7.90 | $n_7$ | 1.72600 | $v_7$ 53.6 |
| | $R_{14}$ | −64.98 | | | | | |

\* \* \* \* \*